May 22, 1934.  W. W. OAKLEY  1,960,164
COOLING BRIDGE WALLS FOR GLASS MELTING FURNACES
Filed Nov. 11, 1932   2 Sheets-Sheet 2

INVENTOR
WALTER W. OAKLEY
BY Dorsey & Cole
ATTORNEY

Patented May 22, 1934

1,960,164

UNITED STATES PATENT OFFICE 1,960,164

COOLING BRIDGE WALLS FOR GLASS MELTING FURNACES

Walter W. Oakley, Corning, N. Y., assignor to Corning Glass Works, Corning, N. Y., a corporation of New York Application November 11, 1932, Serial No. 642,287

1 Claim. (Cl. 49—54)

This invention relates to cooling bridge walls of glass melting furnaces and has for its object more efficient cooling of bridge walls than has been heretofore available.

Another object is simplicity and cheapness of construction of bridge wall cooling devices.

The above and other objects may be accomplished by employing my invention which embodies among the features cooling the bridge wall by absorbing the heat radiated therefrom in pools of liquid supported within the bridge wall, and utilizing the vapor arising from the pools of cooling liquid to absorb heat from the surface of the wall which it contacts.

Figure 1:
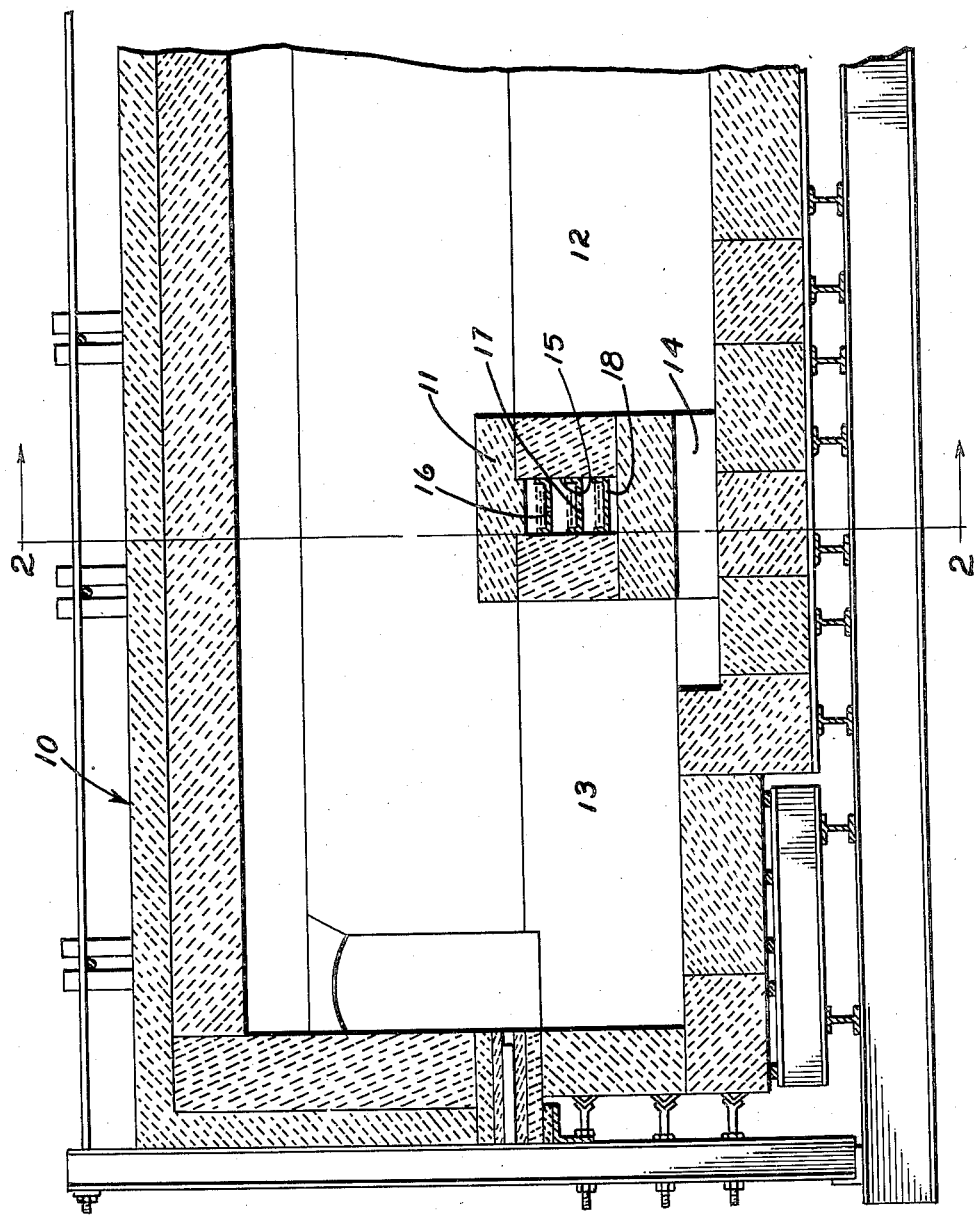
Fig. 1 is a longitudinal sectional view through a glass melting tank in which my improved cooler has been installed.

Referring to the drawings in detail, the glass melting furnace designated generally 10 is divided by a bridge wall 11 into melting and fining chambers 12 and a working chamber 13. The bridge wall is provided with a throat 14 through which glass which has been melted and fined in chamber 12 may enter the working chamber 13. As shown in Fig. 1 the bridge wall is provided with a longitudinally extending passage which opens at opposite ends outwardly through the side walls of the furnace and forms a cooling chamber 15. All of the above construction is quite common in the glass making art as may be seen upon making a cursory examination of the prior issued patents.

Figure 2:
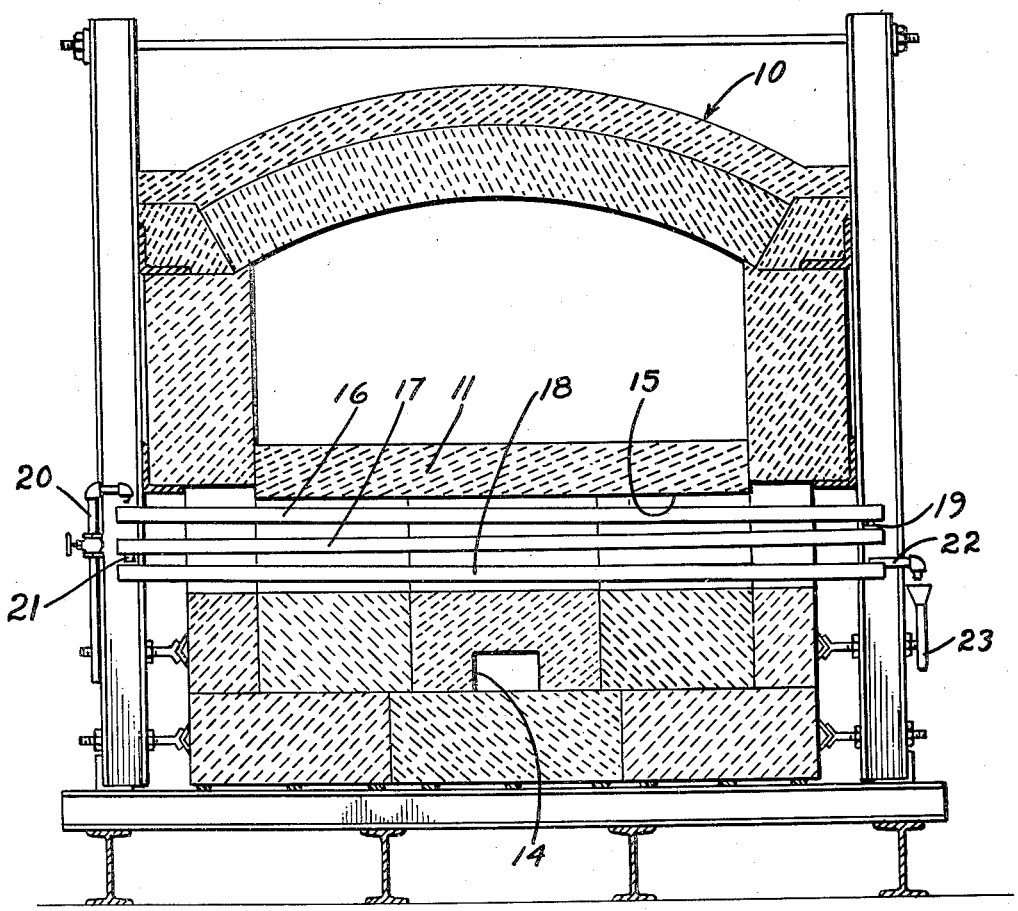
Fig. 2 is a transverse sectional view taken along the line 2—2 of Fig. 1.
Figure 3:
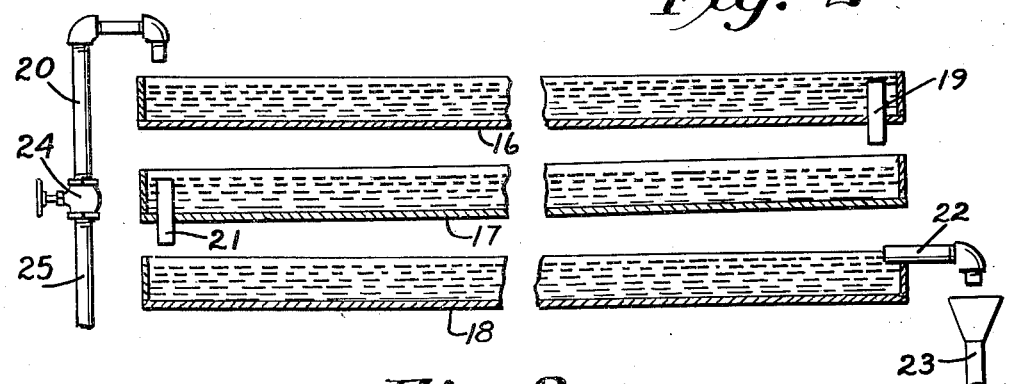
Fig. 3 is a longitudinal sectional view through the cooler.

Secured to the side walls of the cooling chamber 15 are transversely U-shaped troughs 16, 17 and 18. The uppermost trough 16 inclines downwardly toward one end and is provided adjacent its lowermost end with an overflow pipe 19 so that when the cooling liquid which is admitted to the elevated end of the trough 16 through a liquid supply line 20 rises to a predetermined point, it will overflow and be directed downwardly into the trough 17. This trough like the trough 16 inclines downwardly but in the opposite direction and is provided adjacent its lowermost end with an overflow pipe 21 so that after the liquid which is fed into the trough 17 through the pipe 19 has reached a predetermined level it will overflow through pipe 21 and be directed into the elevated end of the trough 18. As shown in Figs. 2 and 3, the trough 18 inclines downwardly toward one end and its elevated end is located directly beneath the overflow pipe 21. Secured to the lowermost end wall of the trough 18 is an overflow pipe 22 which discharges into a drain or waste 23. Like the overflow pipes 19 and 21 the overflow pipe 22 is so located with relation to its perspective trough that no liquid will be discharged until the liquid in the trough has reached a predetermined level. In this way it will be seen that I provide a plurality of liquid pools within the chamber 15 formed in the bridge wall. In order to maintain the liquid in the troughs and to replace that lost through evaporation I find it desirable to continually supply the upper trough 16 from the supply line 20. The supply of the liquid through the supply line is governed by a valve 24 which is connected to a feed pipe 25.

In operation a cooling liquid such as water is admitted to the supply line 20 and flows into the trough 16 filling the latter to a predetermined level. Overflowing through the pipe 19 the liquid fills the trough 17 to a predetermined level after which it overflows into the trough 18 and fills the latter to a predetermined level. The liquid thus forms a series of pools within the bridge wall 11 and absorbs heat through conduction and radiation. As the liquid becomes heated it vaporizes and the vapor contacting with the walls of the chamber 15 further absorbs heat and eventually passes out of the chamber through its open ends. The loss of liquid through vaporization is compensated for by intermittently or continuously admitting additional liquid to the cooler by manipulating valve 24. Since the furnace may be run hotter at certain times than at others, it is obvious that the evaporation rate will vary according to the operating temperature and consequently, a greater or lesser amount of cooling liquid must be supplied to the cooler.

In the above, I have described a cooler consisting of a battery of three troughs but it is obvious that in some instances I may find it desirable to increase or decrease the number of troughs employed and hence I do not wish to be limited to the specific number of troughs described as the principles involved are equally applicable to as many or few troughs as may be found desirable. Obviously, by using the channels as described in the foregoing they will form a satisfactory brace and reenforcement for the bridge wall throughout its entire length.

While in the foregoing there has been shown and described the preferred embodiment of my invention, it is to be understood that minor changes in the construction, combination and arrangement of parts may be resorted to without departing from the spirit and scope of the invention as claimed.

What is claimed is:

A bridge wall cooler comprising a plurality of troughs supported one above the other in spaced relation within a bridge wall, means to admit cooling liquid to the uppermost trough, an overflow pipe to lead the liquid from the uppermost trough into the next lower trough after the liquid in the uppermost trough has reached a predetermined level, and an overflow pipe in the next lower trough to prevent the liquid therein from rising beyond a predetermined level.

WALTER W. OAKLEY.